United States Patent
Crooks et al.

(10) Patent No.: US 10,703,879 B2
(45) Date of Patent: Jul. 7, 2020

(54) PROCESS AND FORMULATION TO JOIN CERAMIC FORMS WHILE MAINTAINING STRUCTURAL AND PHYSICAL CHARACTERISTICS ACROSS THE BOND SURFACE

(71) Applicant: The Boeing Company, Chicago, IL (US)

(72) Inventors: Tab H. Crooks, Dana Point, CA (US); MaryAnn S. Muench, La Mirada, CA (US)

(73) Assignee: The Boeing Company, Chicago, IL (US)

(*) Notice: Subject to any disclaimer, the term of this patent is extended or adjusted under 35 U.S.C. 154(b) by 11 days.

(21) Appl. No.: 14/585,505

(22) Filed: Dec. 30, 2014

(65) Prior Publication Data

US 2016/0185935 A1 Jun. 30, 2016

(51) Int. Cl.
*C08K 3/38* (2006.01)
*B32B 37/06* (2006.01)
(Continued)

(52) U.S. Cl.
CPC .................. *C08K 3/38* (2013.01); *B32B 5/32* (2013.01); *B32B 7/02* (2013.01); *B32B 7/12* (2013.01);
(Continued)

(58) Field of Classification Search
CPC .. C08K 3/38; C08K 2003/387; C04B 37/028; C04B 37/025; C04B 35/6269; C04B 37/005; C04B 37/008; C04B 35/6365; C04B 41/0072; C04B 41/009; C04B 41/80; C04B 2235/5228; C04B 2237/561; C04B 2237/062; C04B 2237/52; C04B 2237/708; C04B 2235/5224; C04B 2235/5236; C04B 2237/597; C04B 2237/38; C04B 2235/526; C04B 2235/5244; C04B 2237/348;
(Continued)

(56) References Cited

U.S. PATENT DOCUMENTS 3,049,447 A * 8/1962 Knapp ................ C04B 41/5006
427/374.7
4,483,955 A * 11/1984 Christiansen ........ C08K 3/0083
264/328.17
(Continued)

FOREIGN PATENT DOCUMENTS

CN 103979099 2/2014
CN 103987677 8/2014
(Continued)

OTHER PUBLICATIONS

Extended European Search Report prepared by European Patent Office in Application No. EP 15 18 8575, dated Sep. 1, 2016.
(Continued)

*Primary Examiner* — Frank J Vineis
*Assistant Examiner* — Michael Zhang
(74) *Attorney, Agent, or Firm* — McDonnell Boehnen Hulbert & Berghoff LLP

(57) ABSTRACT

A ceramic bonding material including at least one fibrous material, a flux agent and a thickening agent wherein the ceramic bonding material fired at a set temperature to bond the two adjacent substrate faces.

14 Claims, 3 Drawing Sheets

(51) Int. Cl.
| | |
|---|---|
| *B32B 18/00* | (2006.01) |
| *B32B 5/32* | (2006.01) |
| *B32B 7/12* | (2006.01) |
| *B32B 7/02* | (2019.01) |
| *C04B 41/00* | (2006.01) |
| *C04B 41/80* | (2006.01) |
| *C04B 37/00* | (2006.01) |
| *C04B 35/626* | (2006.01) |
| *C04B 35/636* | (2006.01) |
| *C04B 37/02* | (2006.01) |

(52) U.S. Cl.
CPC ............. *B32B 18/00* (2013.01); *B32B 37/06* (2013.01); *C04B 35/6269* (2013.01); *C04B 35/6365* (2013.01); *C04B 37/005* (2013.01); *C04B 37/008* (2013.01); *C04B 37/025* (2013.01); *C04B 37/028* (2013.01); *C04B 41/009* (2013.01); *C04B 41/0072* (2013.01); *C04B 41/80* (2013.01); *B32B 2262/105* (2013.01); *B32B 2262/106* (2013.01); *B32B 2266/06* (2013.01); *B32B 2305/72* (2013.01); *C04B 2235/522* (2013.01); *C04B 2235/524* (2013.01); *C04B 2235/526* (2013.01); *C04B 2235/5224* (2013.01); *C04B 2235/5228* (2013.01); *C04B 2235/5232* (2013.01); *C04B 2235/5236* (2013.01); *C04B 2235/5244* (2013.01); *C04B 2235/5248* (2013.01); *C04B 2235/9607* (2013.01); *C04B 2237/062* (2013.01); *C04B 2237/064* (2013.01); *C04B 2237/068* (2013.01); *C04B 2237/08* (2013.01); *C04B 2237/083* (2013.01); *C04B 2237/086* (2013.01); *C04B 2237/32* (2013.01); *C04B 2237/34* (2013.01); *C04B 2237/341* (2013.01); *C04B 2237/343* (2013.01); *C04B 2237/346* (2013.01); *C04B 2237/348* (2013.01); *C04B 2237/36* (2013.01); *C04B 2237/365* (2013.01); *C04B 2237/366* (2013.01); *C04B 2237/38* (2013.01); *C04B 2237/401* (2013.01); *C04B 2237/52* (2013.01); *C04B 2237/561* (2013.01); *C04B 2237/597* (2013.01); *C04B 2237/708* (2013.01); *C08K 2003/387* (2013.01)

(58) Field of Classification Search
CPC ...... C04B 2237/086; C04B 2235/5232; C04B 2237/34; C04B 2235/522; C04B 2237/341; C04B 2237/083; C04B 2237/08; C04B 2237/064; C04B 2237/401; C04B 2235/5248; C04B 2237/365; C04B 2237/366; C04B 2237/36; C04B 2235/9607; C04B 2237/346; B32B 37/06; B32B 7/12; B32B 7/02; B32B 18/00; B32B 5/32; B32B 2305/72; B32B 2262/105; B32B 2266/04; B32B 2262/106
See application file for complete search history.

(56) References Cited

U.S. PATENT DOCUMENTS

| | | | | |
|---|---|---|---|---|
| 4,962,166 | A * | 10/1990 | Boinot | C08J 5/24 427/221 |
| 5,082,918 | A * | 1/1992 | Boinot | C08J 5/24 525/506 |
| 5,495,978 | A * | 3/1996 | Muth | B23K 1/19 228/122.1 |
| 2003/0082414 | A1* | 5/2003 | DiChiara, Jr. | B32B 19/04 428/702 |
| 2003/0106311 | A1* | 6/2003 | Moore, III | B01D 53/945 60/323 |
| 2005/0272602 | A1* | 12/2005 | Ninomiya | B01D 39/2068 502/439 |
| 2008/0178992 | A1* | 7/2008 | Pillai | B28B 1/002 156/197 |
| 2008/0307760 | A1* | 12/2008 | Chatlani | B01D 46/244 55/523 |
| 2009/0033005 | A1* | 2/2009 | Bookbinder | C04B 28/005 264/628 |
| 2009/0239030 | A1* | 9/2009 | Cai | C04B 28/24 428/116 |
| 2010/0112280 | A1* | 5/2010 | Iwamoto | C04B 41/009 428/116 |
| 2014/0124713 | A1* | 5/2014 | Majumdar | H01B 1/22 252/513 |
| 2014/0127412 | A1* | 5/2014 | Vosejpka | B82Y 30/00 427/373 |

FOREIGN PATENT DOCUMENTS

| | | | |
|---|---|---|---|
| CN | 104245630 | 12/2014 | |
| EP | 0205137 A2 * | 12/1986 | ......... C04B 35/4682 |
| EP | 2784050 | 10/2014 | |
| JP | S60206600 A | 10/1985 | |
| JP | S62282772 A | 12/1987 | |
| JP | 2006282419 A | 10/2006 | |
| JP | 2014114186 A | 6/2014 | |
| JP | 2014521578 A | 8/2014 | |
| WO | 2008/094954 | 7/2008 | |
| WO | 2013015932 A1 | 1/2013 | |
| WO | 2013/090214 | 6/2013 | |

OTHER PUBLICATIONS

Ingamells et al., "Lithum Metaborate Flux in Silicate Analysis", Analytica Chimica Acta, Elsevier, Amsterdam, NL, vol. 52, No. 2, Nov. 1, 1970, p. 323-334.
Partial European Search Report prepared by European Patent Office in Application No. EP 15 18 8575, dated May 3, 2016.
Chemical encyclopedic dictionary, Moscow, Soviet dictionary, 1983, pp. 79, 304.
Clemper, D., "Polymeric Foams and Foaming Technology", Professia, Saint-Petersburg, 2009, pp. 438-451.
Office Action of the Substantive Examination prepared by the Russian Patent Office in application No. 2015141771/05 dated Feb. 19, 2019, English translation included.
JP Application No. 2015-199216; Office Action dated Jul. 29, 2019.
First Office Action issued in CN Application No. 201510968329.1 dated Mar. 17, 2020. English Translation included.
Jiangsu Xinxing, Ceramic Industry School, China Light Industry Press, Feb. 28, 1985, claims 1-15, pp. 573.

* cited by examiner

PROCESS AND FORMULATION TO JOIN CERAMIC FORMS WHILE MAINTAINING STRUCTURAL AND PHYSICAL CHARACTERISTICS ACROSS THE BOND SURFACE

TECHNICAL FIELD

This invention generally relates to bonding ceramic foam materials together using bonding compositions including one or more fibrous materials, a bonding flux agent and a thickening agent to form a well-bonded interface.

BACKGROUND

The statements in this section merely provide background information related to the present disclosure and may not constitute prior art Ceramic foam materials are well known for their excellent mechanical properties and stability at high temperature and have been widely used as high temperature structural materials in many fields, including in the aeronautic fields. Due to manufacturing constraints and/or varying three dimensional surfaces, it is difficult to manufacture large ceramic foam structures from a single piece of ceramic material. Therefore, large ceramic foam structures are typically constructed from a multitude of ceramic blocks or pieces that are bonded to one another.

Bonding two or more ceramic blocks together to form a single structure presents challenges. Traditional joining or bonding technologies like mechanical connection, diffusion bonding and brazing are used for ceramic-to-ceramic connections. However, each of these known techniques has drawbacks.

Another method of bonding two or more ceramic foam pieces together is to use a bonding material that functions as a permanent adhesive. Under current practices, when a bonding material is used, each ceramic face that is bound to an adjacent ceramic face is sealed in order to create a robust bonding surface. However, sealing the ceramic face bonding surfaces inhibits the flow of air through ceramic foam materials and, therefore, inhibits heating or cooling of the ceramic foam structures. In addition the bonding material can be a continuous material and thereby act as a seal between adjacent ceramic pieces.

Although there has been limited success with known methods of bonding porous ceramic components, challenges still exist. Accordingly, there is a need for improved bonding compositions and bonding methods that are capable of bonding to ceramic foam articles without severely impacting the porosity and air flow characteristics of the material.

SUMMARY

This invention is directed generally to bonding ceramic foam materials together using a composition comprising one or more fibrous materials, a bonding flux agent and a thickening agent to establish a well-bonded interface and maintain material properties and characteristics of the baseline parent material at the bonded interface region. Fibrous materials are similar to the ceramic foam in CTE characteristics, and can be of the same material.

The disclosed embodiments provide methods and compositions that are especially useful for bonding ceramic foam substrates together to create larger foam structures while maintaining consistent material properties at bond interfaces located between individual foam pieces.

In one aspect, this invention includes a bonding material comprising a fibrous material, a fluxing agent; and a thickening agent wherein the fibrous material has a CTE that is substantially similar to the CTE of at least one substrate component that is bonded by the bonding material.

Another aspect of this invention is a bonding material comprising an aqueous admixture of from about 50 wt % to about 90 wt % of chopped aluminum borosilicate fibers having an average length of from about $\frac{1}{16}^{th}$ of an inch of about ½ of an inch; from less than about 0.01 wt % to about 5 wt % of lithium metaborate; and from greater than about 0 wt % to about 10 wt % methylcellulose wherein the aluminum borosilicate has a CTE that is substantially similar to the CTE of at least one substrate that is bonded by the bonding material.

Still another aspect of this invention is a composite structure comprising a first substrate having a bonding surface, a second substrate having a bonding surface, the first and second substrates have different coefficients of thermal expansion (CTEs) and a bonding material located at a gap between the first substrate bonding surface and the second substrate bonding surface, the bonding material bonding the first substrate to the second substrate, the bonding material comprising a cured admixture of a fibrous material, a fluxing agent; and a thickening agent wherein the fibrous material has a CTE that lies between the CTE of the first substrate and the CTE of the second substrate.

Yet another aspect of this invention is a composite structure comprising a first ceramic foam substrate having a bonding surface, a second ceramic foam substrate having a bonding surface, the first and second substrates having substantially the same CTE and a bonding material located between the first substrate bonding surface and the second substrate bonding surface, the bonding material bonding the first substrate to the second substrate, the bonding material comprising a cured admixture of a fibrous material, a fluxing agent; and a thickening agent wherein the fibrous material has a CTE that is substantially similar to the CTE of the first and second ceramic foam substrates.

BRIEF DESCRIPTION OF THE FIGURES

The present disclosure will become more fully understood from the more detailed description presented below and the accompanying drawings which are presented by way of illustration only, and thus, are not limitations of the present disclosure, and wherein.

Corresponding parts are marked with the same reference symbols in all figures.

DETAILED DESCRIPTION

One aspect of this invention are bonding materials that include fibrous materials and a bonding flux agent in the proper proportion, along with a thickening agent. When applied "green" (uncured) to opposing bonding surfaces of substrates, the bonding material is viscous enough to prevent deep penetration of the bonding material into the substrate. Subsequent firing of the substrate and green bonding material in a furnace at curing temperatures converts the green bonding material into a cured bonding material and thereby forms a permanent bond between two opposing substrate surfaces. The cured bonding material is porous and does not significantly interfere with the porous and air flow characteristics of porous substrate materials.

Figure 1A:
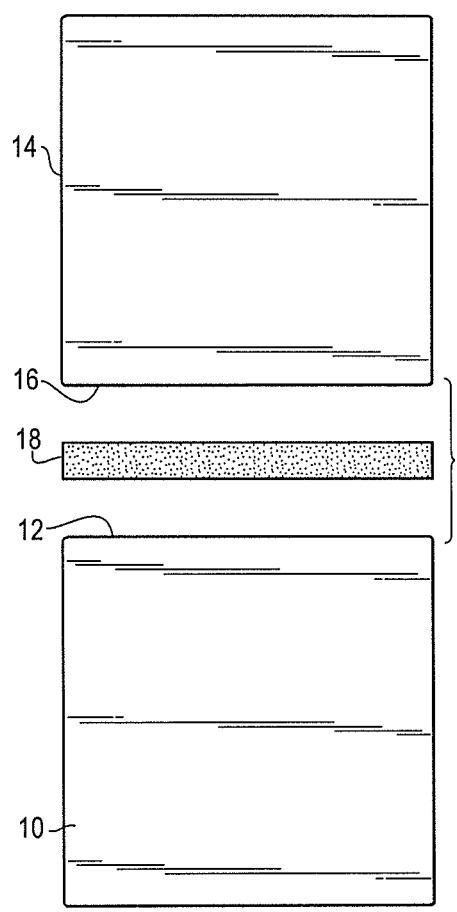
FIG. 1A is a side view of substrate components 10 and 14 including a bonding material 18 positioned between the substrate.
Figure 1B:
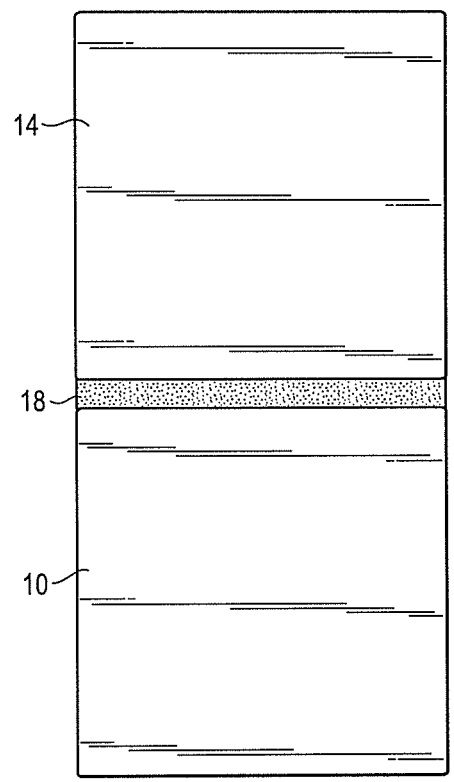
FIG. 1B is a side view of the two substrate components shown in FIG. 1 after the bonding material has formed a green bond between the substrate components.
Figure 3:
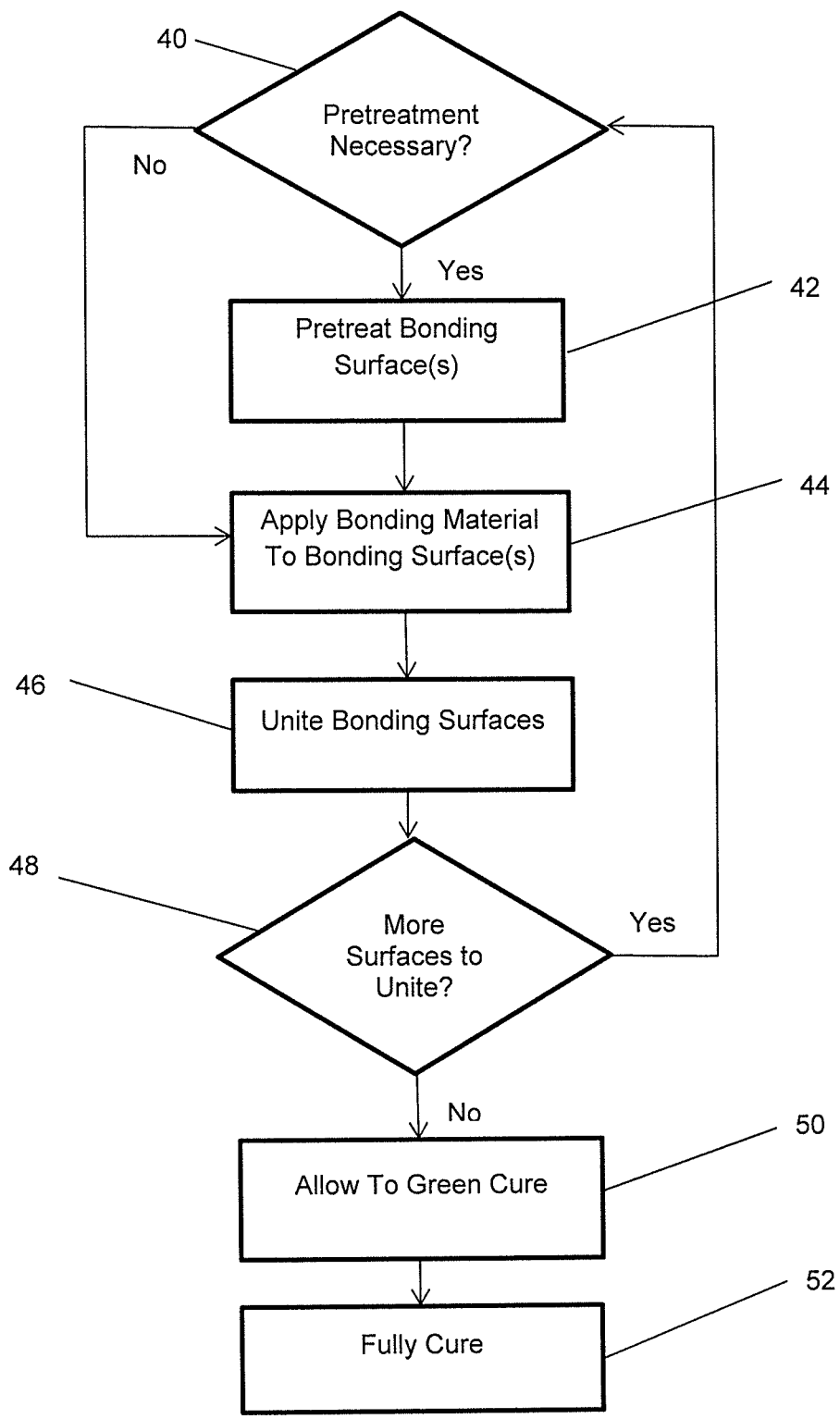
FIG. 3 is a flow chart of a method for forming a ceramic material structure.

The methods of this invention will be discussed with reference to FIG. 1A, FIG. 1B and FIG. 3. FIGS. 1A and 1B show two substrate components 10 and 14. Each substrate component 10 and 14 further include complementary bonding surfaces 12 and 16. Substrate bonding surfaces 12 and 16 may be untreated or they may be pretreated before undergoing bonding. Therefore, as shown in FIG. 3, an initial step 40 in the methods of forming a ceramic material structure of this invention is to decide if bonding surface pretreatment is necessary. If bonding surface pretreatment is necessary, then in step 42, the pretreatment can be accomplished by known methods such as by mechanical or chemical procedures that enhance the ability of the bonding surface to bond with the bonding material. For example, the bonding surfaces can be mechanically roughened or polished using sand, grit, a file, sand blasting and so forth. In another example, the bonding surfaces can be chemically etched and/or cleaned prior to the application of the bonding material.

In step 44, a bonding material layer 18—shown in the space between substrate components 10 and 14 in FIG. 1A—can be applied to either bonding surface 12, bonding surface 16 or to both substrate bonding surfaces 12 and 16. The bonding material layer will typically be applied to a thickness on one or both adjacent bonding surfaces of from about 0.1 mil to about 10 mils (0.0001 inches to 0.01 inches). Once bonding material layer 18 is applied to one or both substrate bonding surfaces the surfaces are brought into contact with one another in step 46 and a slight pressure can optionally be applied perpendicular to the generally planar bonding material layer to form an assembly 19 that includes an uncured bonding material layer. The slight pressure can be applied as shown for example in FIG. 1B by orienting the two substrate components such that one substrate component rests on top of the other such that the force of the weight of the top substrate component is directed against or towards the bonding material layer. Alternatively, a slight pressure can be applied to keep the substrate components together by using rubber bands, strings, small weights and so forth. At process step 48, a decision is made whether the fabrication of the uncured ceramic material structure is complete or if additional bonding surfaces need to be united before the structure is complete. If additional bonding is required, then steps 40-46 are repeated until the uncured ceramic material structure is complete.

In some instances, an adequate temporary "green bond" (a bond formed by the uncured bonding material) can be formed by allowing the bonding material to rest and green cure in step 50 after which any pressure that is applied to keep the substrate components together can be optionally released. Alternatively, the slight pressure or restraint supplied to substrate components 10 and 14 can be maintained until bonding material layer 18 is fully cured.

In step 52, the uncured ceramic material structure or assembly is cured. The assembly 19 including green bonding material layer 18 is typically cured by placing it in a curing apparatus such as an oven, kiln, calciner, autoclave or similar heating apparatus that is typically operated at ambient pressure. The curing apparatus temperature may vary depending upon the selection of bonding material components. However, it is contemplated that the furnace temperature will range from about 120° F. to about 500° F. and more preferably from about 160° F. to about 370° F. Moreover, the curing can be accomplished using a single step or multi-step heating profile. The assembly, including the green bonding material layer, should remain in the curing apparatus for a time that is sufficient to form a cured bonding material layer. The cure time may vary depending upon the selection of the material used in the assembly—the substrate(s) and bonding material ingredients. It is contemplated that the curing time will range from about 2 to about 12 hours and more likely from about 4 to about 10 hours. The cured assembly may be removed from the curing apparatus while hot and allowed to cool or it may be allowed to cool slowly by leaving the assembly in the curing apparatus after the curing apparatus is shut off.

Figure 2:
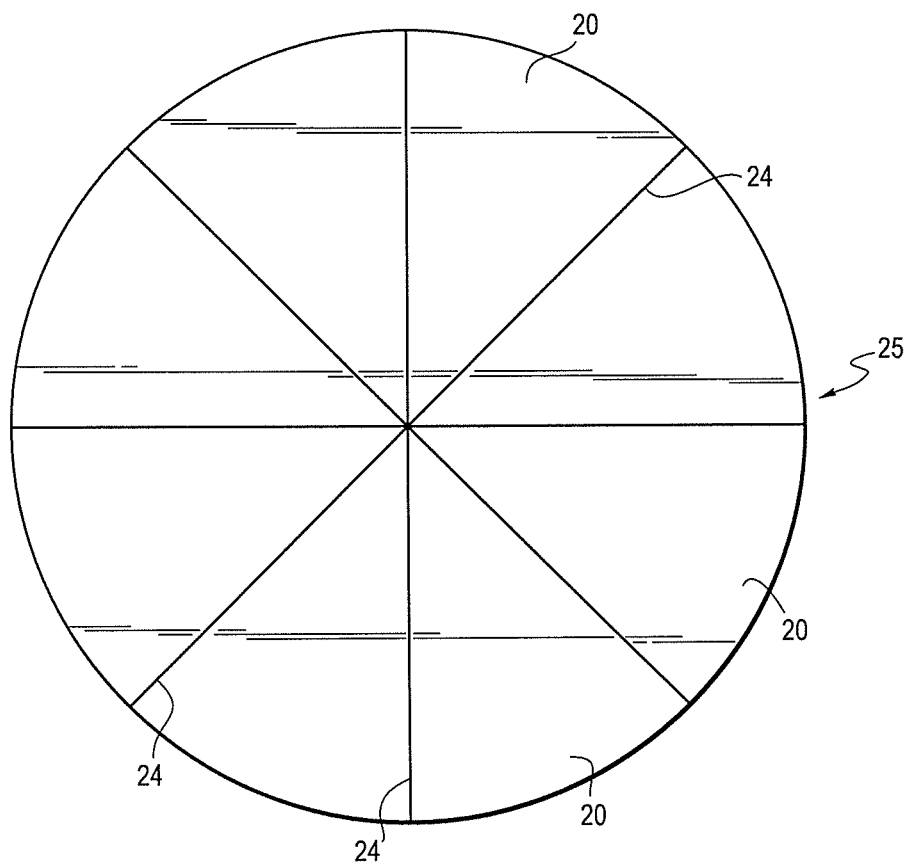
FIG. 2 is a top view of a large ceramic material structure including a plurality of individual substrates separated by cured bonding material layers.

The bonding materials of the present invention may be used to form complex assemblies by bonding a plurality of substrate pieces together to form the complex assembly. FIG. 2 is an overhead view of a complex assembly 25 that includes a plurality of individual substrates 20, each substrate having one or more bonding surfaces. The bonding materials of this invention will be applied as a layer to bonding surfaces as complex assembly 25 is created. Once completed, the complex assembly will be placed in a furnace as a single piece and fired to form cured complex assembly 25 which includes multiple cured bonding material layers 24.

The bonding materials of this invention include at least one fibrous material, at least one fluxing agent and at least one thickening agent. The fibrous material is included in the bonding material to help form a porous cured bonding material. The cured bonding material can have a porosity ranging anywhere from 50% to as high as 98% and more typically from about 85% to 95%.

A porous cured bonding material is formed when individual fiber pieces become adhered to one another in a random fashion when they are admixed with the remaining bonding material ingredients and cured. The fibrous material may be any type of fiber that can survive bonding material curing conditions. Depending on the properties of the fibrous component, the fibers may or may not fully or partially melt (i.e. $SiO_2$ vs. $ZrO_2$). In one aspect of this invention the bonding material will undergo surface fluxing thereby causing the fibers to cross bind with one another. The individual fibers in the fibrous material will typically have a length "L" that is significantly larger than its diameter "D" with the L:D ratio being greater than about 10 and preferably greater that about 100. Alternatively, or in addition, the fibrous material will be chopped fibers or whiskers having an average chopped length of from about 1/16 inch to about 1/2 inch and alternatively from about 1/8 inch to about 1/4 inch.

The one or more fibrous materials may be selected from a variety of ceramic fibers or ceramic metal fibers. Useful fibers include, but are not limited to fibers of silica ($SiO_2$), alumina ($Al_2O_3$), zirconium oxide ($ZrO_2$), titanium oxide ($TiO_2$), aluminum silicate (Al—Si-oxide), aluminum borosilicate with or without an alkali metal, carbon, borosilicate, silicon nitride (SiN), silicon carbide (SiC), and combinations of these fibers. In another embodiment, the fibers can be made from the same material as the substrate material to which the bonding material is applied. In addition, when glass fibers are used, the fibers may be in one or both of a crystalline phase and glass phase.

The fibrous material may be selected from a material with a coefficient of thermal expansion "CTE" that is substantially similar to the CTE of at least one substrate to which the bonding material is applied. By "substantially similar" we mean that the CTE's of the two materials should be within ±20% of each other and more preferably within ±10% of each other. By "substantially the same" we mean that two CTE's are within ±5% of each other. By balancing the CTE's of the two materials, the bond formed by the cured bonding material is more likely to withstand one or more temperature cycles without failing. This is because the cured bonding material and the substrate material having substantially similar CTE's will expand and contract at essentially the same rates when the assembly undergoes significant temperature cycles during curing and/or in use. In some structures, adjacent substrates (substrates having abutting bonding surfaces) will have different CTEs. In such structures it is desirable to select a fiber material that has a CTE that lies somewhere between the CTE's of the adjacent substrates. This allows the bonding material to form a CTE transition, or CTE transition region, between substrates with dissimilar CTEs. In this situation, it is useful to balance the CTE of the fibrous material with the substrate material as well as the CTE of the cured bonding material with the substrate material.

It should be noted that the complex structures of this invention may be instructed of a plurality of substrates some of which have equal CTEs and some of which have different CTEs. Thus, it is contemplated that complex structures will be formed using different bonding material recipes, i.e., bonding materials in which the selection of the fibrous material has been tailored to have a specific CTE and a specific bonding surface.

Fibrous material may be present in the bonding materials of this invention in an amount ranging from about 50 wt % to about 90 wt % and more likely from about 70 wt % to about 90 wt % of the uncured material. This will correspond to an amount ranging from about 60 wt % to about 95 wt % of the cured bonding material.

The bonding material further includes at least one fluxing agent. The fluxing agent can be selected from any material that lowers the melting point or softening temperature of the matrix material at the bonding surface of the substrate component(s) that the bonding material contacts. Fluxing agents interact with the surface molecular structure of the bonding surfaces and pull them away (dissolve them) molecule-by-molecule thereby providing bonding sites for the bonding material ingredients.

The selection of fluxing agent(s), therefore, can depend upon the substrate material that is being bound by the bonding material. The one or more fluxing agents can generally be selected from any borated, carbonated, or carbide alkali or alkaline earth salts. Some examples of useful fluxing agents include, but are not limited to, sodium carbonate, boron carbide, lithium metaborate, cadmium borate, lithium borate, silicon boride, cadmium borosilicate, bismuth oxide, lead borosilicate, lithium tetraborate, cadmium borate, cadmium borosilicate, lead borosilicate or combinations thereof.

The one or more fluxing agents are typically supplied as a particulate material and can be incorporated into the bonding material in the range of from less than about 0.01 wt % to about 5 wt % and more typically from about less than 0.05 wt % to about 1 wt %. This generally corresponds to a rage of fluxing material in the cured bonding material of from about less than 0.01 wt % to about 5 wt %.

The bonding materials of this invention will further include one or more thickening agent. The thickening agent is added to the bonding materials in order to adjust the bonding material viscosity so that it can be applied to substrate bonding surfaces such that the substrate surfaces can be completely covered with the bonding material and such that the bonding material does not migrate very far into the substrate material after it is applied. In this regard, the thickening agent can be used to control the viscosity of the bonding material. In one aspect of the invention, the viscosity of the green bonding material will be adjusted so that the bonding material can penetrate into the porous substrate to a depth of from about $1/32$ inch to about $1/2$ inch and more ideally from about $1/16$ inch to about $1/4$ inch.

The one or more thickening agent can be selected from any material that is known to be useful in controlling the viscosity of a viscous material. The thickening agent may participate in the formation of a bond between substrate pieces during bonding material curing or the thickening agent may be inert in the bonding process. Some examples of thickening agents include: natural compounds such as starches including arrowroot, cornstarch, sago and tapioca; vegetable gums such as alginin, guar gum and xanthan gum; sugars such as agar and carrageenan; proteins such as collagen and casein; pectin; cellulosic materials; and gelatin. Synthetic thickening agents may also be used. Examples of useful synthetic thickening agents include polyethylene glycol, polyacrylic acid, organo silicones, sodium and calcium sulfonates and polyvinyl alcohol.

One particularly useful class of thickening agents are cellulosic materials—derived from cellulose. Useful cellulosic materials include, for example, microcrystalline cellulose and modified cellulose such as cellulose ethers including methylcellulose. Cellulosic materials are useful partly because water can be used to wet modified cellulose. The modified cellulose materials are composed primarily of polysaccharides that eventually volatize during the bond curing heat treatment. The modified cellulose is supplied as an aqueous solution (e.g. solution of 2% methylcellulose and DI water) and it is admixed with the other bonding material ingredients in an amount sufficient to provide the desired bonding material viscosity. As noted above, the desired bonding material viscosity can depend upon a variety of factors such as the porosity of the substrate and the desired depth of penetration of the bonding material into the substrate. Factors that can influence the bonding material viscosity include, but are not limited to, bonding material composition, environmental conditions during bonding material application such as temperature and humidity and substrate properties such as substrate porosity. The modified cellulose also imparts some "green strength" to the bonding composition that causes adjacent substrate components to adhere to one another before heat curing. One particular useful modified cellulose is methyl cellulose or Methocel manufactured and sold by Dow Chemical.

The total amount of modified cellulose used in the final bonding material can be in the range of from greater than about 0 wt % to about 10 wt %. Water, preferably cold di-ionized water, can be added to the admixture of bonding material components to achieve the desired bonding material viscosity.

The bonding materials of this invention are useful in bonding a variety of substrate materials. The bonding material is formulated primarily to bond ceramic substrate materials. The ceramic material useful in the substrates of this invention include traditional and advanced ceramic material and include inorganic crystalline material compounded of a metal and a non-metal that is solid (and possibly formed into a foam) and inert. Ceramics generally can withstand very high temperatures such as temperatures that range from 1,000° C. to 1,600° C. (1,800° F. to 3,000° F.).

Traditional ceramics are derived from raw materials including clay minerals and include, for example porcelain. Advanced ceramic materials include but are not limited to aluminum oxide, silicon carbide, tungsten carbide, Zinc oxide, lead zirconate titanate, barium titanate, silicon aluminum oxynitride, magnesium silicates, titanium carbide, zirconium oxide and the like.

In one aspect of this invention, the substrate can be an open-cell ceramic foam material. Open-cell ceramic foam substrates can be made by a variety of methods using the ceramic materials listed above or other ceramic materials. Ceramic foam manufacturing techniques include impregnating open-cell polymer foams internally with ceramic slurry and then firing in a kiln, leaving only ceramic material. The foams may consist of several ceramic materials such as aluminum oxide (alumina), silicate foam tiles and foam tiles made from SiO2, silica-alumina (SiO2-Al2O3-x) SiN, ZrO and any other useful high-temperature ceramic materials. The substrate can also be formed from any fibrous or porous material that is combined with a fluxing agent.

Ceramic foam materials have useful thermal insulating properties due to the many tiny air-filled voids within the material. Examples of open-cell polymer foam materials include thermoset resin-ceramic such as polyester and alumina, silica and talc; thermoplastic resins, phenolic thermoplastic resin and alumina, silica and talc; epoxy thermoplastic resin and alumina, silica and talc; polyurethane and alumina, silica and talc; cellulose and alumina, silica and talc; polyester and alumina, silica and magnesia; phenolic thermoplastic resin and alumina, silica and magnesia; epoxy thermoplastic resin and alumina, silica and magnesia; polyurethane and alumina, silica and magnesia; cellulose and alumina, silica and magnesia; alkyl thermoplastic resin and alumina, silica and magnesia; or any combinations thereof. Finished open-cell ceramic substrates may be manufactured from gamma-alumina, mullite, spodumene, silica, etc. it is to be further understood that the aforementioned open-cell ceramic foam substrates are merely only representative of the class of such substrates.

EXAMPLE

A green bonding material was prepared by combining the following ingredients:
Nextel™ 312 (alumina-boria-silica) chopped fiber—12 wt %;
Lithium metaborate powder—0.1 wt %;
Methyl cellulose—88 wt %;
Water as needed.

The green bonding material was used to bond two silica rich fibrous tile substrates having approximately 90-95% void volume.

The green bonding material was trowled with a spatula or wiped on bonding surfaces of each of two bond tile substrates after which the bonding surfaces were immediately joined bond face to bond face. The bond faces were then slightly twisted or "ground" together to ensure face-to-face contact and potential co-mingling of the fibrous faces. A weight was placed on top of one bonding component and the adhesive was air dried to form a green bond. The green bond was then cured to form a cured bond.

The resulting bond between the two tiles substrate faces was visually hard to distinguish. The cured bond was sufficient to permit material handling and possibly machining.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:
1. A bonding material consisting of:
chopped fibers;
from about 0.05 to about 1.0 wt % of a fluxing agent that is one or more of sodium carbonate, boron carbide, lithium metaborate, cadmium borate, cadmium borosilicate, bismuth oxide, lithium tetraborate, and lead borosilicate; and
a thickening agent wherein the thickening agent is a starch, a vegetable gum, a sugar, a protein, pectin, gelatin, or a combination thereof.
2. The bonding material of claim 1 wherein the chopped fibers have an average length of from about $\frac{1}{16}$th of an inch to about ½ of an inch.
3. The bonding material of claim 1 wherein the chopped fibers are selected from fibers of silica ($SiO_2$), alumina ($Al_2O_3$), zirconium oxide ($ZrO_2$), titanium oxide ($TiO_2$), aluminum silicate (Al-Si-oxide), aluminum borosilicate—with or without an alkali metal, carbon, borosilicate, silicon nitride (SiN) or silicon carbide (SiC) and combinations of these fibers.
4. The bonding material of claim 1 wherein the chopped fibers are aluminum borosilicate.
5. The bonding material of claim 1 wherein the chopped fibers are present in the bonding material before it is cured in an amount ranging from about 50 wt % to about 90 wt %.
6. The bonding material of claim 1 wherein the thickening agent is present in the bonding material before it is cured in an amount ranging from greater than about 0 wt % to about 10 wt %.
7. A composite structure comprising:
a first ceramic foam substrate having a first ceramic foam substrate bonding surface, a second ceramic foam substrate having a second ceramic foam substrate bonding surface; and
a bond region formed by curing the bonding material of claim 1 in contact with the first ceramic foam substrate bonding surface and the second ceramic foam substrate bonding surface.
8. A composite structure comprising;
a first substrate having a first substrate bonding surface, a second substrate having a second substrate bonding surface; and
a green bonding material located between and in contact with the first substrate bonding surface and the second substrate bonding surface, the green bonding material consisting of the bonding material according to claim 1.
9. The composite structure of claim 8 wherein the first and second substrates are each ceramic foam substrates.
10. The composite structure according to claim 8 wherein the green bonding material penetrates into at least one of the first substrate bonding surface and the second substrate bonding surface to a depth of from about 1/32 inch to about 1/2 inch.

11. A bonding material consisting of an aqueous admixture of:
from about 50 wt % to about 90 wt % of chopped aluminum borosilicate fibers having an average length of from about 1/16th of an inch to about 1/2 of an inch;
from about 0.01 wt % to about 5 wt % of lithium metaborate; and
from greater than about 0 wt % to about 10 wt % methylcellulose.

12. A composite structure comprising:
a first ceramic foam substrate having a first ceramic foam substrate bonding surface, a second ceramic foam substrate having a second ceramic foam substrate bonding surface; and
a bonding material located between the first substrate bonding surface and the second substrate bonding surface, the bonding material being formed by applying the bonding material of claim 11 to the first ceramic foam substrate bonding surface and to the second ceramic foam substrate bonding surface such that the bonding material penetrates into the first ceramic foam substrate bonding surface to a depth of from about 1/32 inch to about 1/2 inch wherein after curing, the cured bonding material bonds the first ceramic foam substrate to the second ceramic foam substrate.

13. A composite structure comprising:
a first substrate having a first substrate bonding surface, a second substrate having a second substrate bonding surface, and the first and second substrates have different coefficients of thermal expansion (CTEs); and
a bonding material located between and in contact with the first substrate bonding surface and the second substrate bonding surface, wherein the bonding material consists of the bonding material according to claim 11.

14. A composite structure comprising:
a first ceramic foam substrate having a first ceramic foam substrate bonding surface and a second ceramic foam substrate having a second ceramic foam substrate bonding surface; wherein the first and second substrates are fused at a bonding region consisting of product produced by curing, at a temperature of from about 1,000° C. to about 1,600° C., the following:
a thickening agent selected from a starch, a vegetable gum, a sugar, a protein, pectin, a cellulosic material, gelatin a synthetic thickening agent, and combinations thereof,
material at the first ceramic foam substrate bonding surface,
material at the second ceramic foam substrate bonding surface,
one or more of sodium carbonate, boron carbide, lithium metaborate, cadmium borate, cadmium borosilicate, bismuth oxide, lithium tetraborate, and lead borosilicate, and
fibers selected from fibers of silica (SiO2), alumina (Al2O3), zirconium oxide (ZrO2), titanium oxide (TiO2), aluminum silicate (Al-Si-oxide), aluminum borosilicate—with or without an alkali metal, carbon, borosilicate, silicon nitride (SiN) or silicon carbide (SiC) and combinations thereof.

* * * * *